(12) United States Patent
Page

(10) Patent No.: US 11,945,574 B2
(45) Date of Patent: *Apr. 2, 2024

(54) AIRCRAFT FOR COMMERCIAL AIR TRAVEL AND A METHOD OF MANUFACTURE

(71) Applicant: JETZERO, Inc., Long Beach, CA (US)

(72) Inventor: Mark A. Page, Orange, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,384

(22) Filed: Aug. 25, 2022

(65) Prior Publication Data

US 2023/0002037 A1 Jan. 5, 2023

Related U.S. Application Data

(63) Continuation of application No. 17/478,683, filed on Sep. 17, 2021, now Pat. No. 11,453,483, which is a
(Continued)

(51) Int. Cl.
*B64C 25/04* (2006.01)
*B64C 39/10* (2006.01)

(52) U.S. Cl.
CPC .............. *B64C 25/04* (2013.01); *B64C 39/10* (2013.01); *B64C 2039/105* (2013.01)

(58) Field of Classification Search
CPC .... B64C 25/04; B64C 39/10; B64C 2039/105
See application file for complete search history.

(56) References Cited

U.S. PATENT DOCUMENTS

| 2,650,780 A * | 9/1953 | Northrop ................ B64C 39/10 244/119 |
| 5,893,535 A * | 4/1999 | Hawley ..................... B64C 3/00 244/119 |

(Continued)

FOREIGN PATENT DOCUMENTS

| DE | 202007014079 U1 * | 7/2008 | ........... B64C 1/1476 |
| EP | 0578954 A1 | 1/1994 | |

OTHER PUBLICATIONS

Page, Single-Aisle Airliner Disruption With a Single-Deck Blended-Wingbody, Sep. 30, 2018.
(Continued)

*Primary Examiner* — Joseph W Sanderson
(74) *Attorney, Agent, or Firm* — Caldwell Intellectual Property Law

(57) ABSTRACT

Aspects related to aircraft for commercial air travel and methods of manufacture. An aircraft includes a blended wing body, a single deck located within the blended wing body, wherein the single deck additionally includes a passenger compartment located in a lateral middle portion of the blended wing body and at least a cargo store located laterally outside the passenger compartment, and a landing gear, wherein the landing gear includes at least a nose gear located substantially forward of the single deck and at least a main gear located substantially aft of the single deck, wherein one or more of the at least a nose gear and the at least a main gear occupies a gear housing that overlaps with a plane coincident with at least a portion of the single deck.

18 Claims, 8 Drawing Sheets

Related U.S. Application Data continuation-in-part of application No. 16/181,687, filed on Nov. 6, 2018, now Pat. No. 11,186,359, and a continuation-in-part of application No. 16/726,765, filed on Dec. 24, 2019, now Pat. No. 11,697,500, and a continuation-in-part of application No. 16/730,754, filed on Dec. 30, 2019, now Pat. No. 11,433,991, said application No. 16/181,687 is a continuation of application No. 15/198,611, filed on Jun. 30, 2016, now Pat. No. 10,150,558.

(60) Provisional application No. 62/786,615, filed on Dec. 31, 2018, provisional application No. 62/787,101, filed on Dec. 31, 2018.

(56) References Cited

U.S. PATENT DOCUMENTS

| | | | |
|---|---|---|---|
| 5,897,078 A | 4/1999 | Burnham et al. | |
| 6,568,632 B2 | 5/2003 | Page et al. | |
| 6,866,225 B2* | 3/2005 | Jones | B64D 11/00151 701/1 |
| 7,093,798 B2* | 8/2006 | Whelan | B64C 1/10 244/120 |
| 7,644,888 B2* | 1/2010 | Eakins | B64C 30/00 244/119 |
| 8,104,717 B2* | 1/2012 | Wakayama | B64C 1/22 244/137.4 |
| 8,113,464 B2* | 2/2012 | Cazals | B64D 27/20 244/45 R |
| 8,608,109 B2* | 12/2013 | Campbell | B64C 1/00 244/119 |
| 9,611,039 B2 | 4/2017 | Lieven et al. | |
| 10,150,558 B2* | 12/2018 | Page | B64C 39/10 |
| 10,167,081 B2 | 1/2019 | Gallant et al. | |
| 10,384,796 B2 | 8/2019 | Alexander | |
| 10,407,151 B2* | 9/2019 | Cazals | B64C 1/1423 |
| 10,899,451 B2 | 1/2021 | Saint-Marc et al. | |
| 11,186,359 B2* | 11/2021 | Page | B64C 25/14 |
| 11,433,991 B2* | 9/2022 | Whitlock | B64C 19/00 |
| 11,453,483 B2* | 9/2022 | Page | B64D 9/00 |
| 11,591,066 B1* | 2/2023 | Rawdon | B64C 3/56 |
| 11,697,500 B2* | 7/2023 | Whitlock | B64C 39/10 244/119 |
| 2002/0145075 A1* | 10/2002 | Page | B64C 39/10 244/36 |
| 2003/0213870 A1* | 11/2003 | Eakins | B64C 1/0009 244/119 |
| 2004/0217234 A1* | 11/2004 | Jones | A61M 21/02 244/118.5 |
| 2005/0178912 A1* | 8/2005 | Whelan | B64C 1/10 244/120 |
| 2008/0149763 A1* | 6/2008 | Wakayama | B64C 39/02 244/118.1 |
| 2013/0119198 A1* | 5/2013 | Campbell | B64C 1/00 156/79 |
| 2014/0175215 A1* | 6/2014 | Gallant | B64F 1/30 244/36 |
| 2014/0319274 A1* | 10/2014 | Lieven | B64D 11/00 244/118.5 |
| 2017/0247100 A1* | 8/2017 | Cazals | B64C 1/1423 |
| 2018/0334254 A1* | 11/2018 | Saint-Marc | B64D 11/003 |
| 2020/0207463 A1* | 7/2020 | Schuster | B64C 25/26 |
| 2020/0207464 A1 | 7/2020 | Whitlock et al. | |
| 2020/0207476 A1 | 7/2020 | Whitlock et al. | |
| 2022/0001974 A1* | 1/2022 | Page | B64D 9/00 |
| 2022/0041270 A1* | 2/2022 | Page | B64C 39/10 |
| 2022/0380027 A1* | 12/2022 | Whitlock | B64C 25/20 |
| 2022/0388633 A1* | 12/2022 | Page | B64C 25/14 |
| 2023/0242246 A1* | 8/2023 | Page | B64C 25/14 244/102 R |

OTHER PUBLICATIONS

Fuchte, Optimization of Revenue Space of a Blended Wing Body, Sep. 30, 2014.

* cited by examiner

AIRCRAFT FOR COMMERCIAL AIR TRAVEL AND A METHOD OF MANUFACTURE

CROSS-REFERENCE TO RELATED APPLICATIONS

This application is a continuation of Non-Provisional application Ser. No. 17/478,683, filed on Sep. 17, 2021, and entitled "AN AIRCRAFT FOR COMMERCIAL AIR TRAVEL AND A METHOD OF MANUFACTURE," which is a continuation-in-part of Non-provisional application Ser. No. 16/181,687 filed on Nov. 6, 2018 and entitled "TILTING LANDING GEAR SYSTEMS AND METHODS," Non-provisional application Ser. No. 16/726,765 filed on Dec. 24, 2019 and entitled "EMERGENCY EGRESS IN A BLENDED WING BODY AIRCRAFT," and Non-provisional application Ser. No. 16/730,754 filed on Dec. 30, 2019 and entitled "TILTING LANDING GEAR SYSTEMS AND METHODS," the entirety of each of which is incorporated herein by reference. These applications claim the benefit of priority of Non-provisional application Ser. No. 15/198,611 filed on Jun. 30, 2016 and entitled "TILTING LANDING GEAR SYSTEMS AND METHODS," U.S. Provisional Patent Application Ser. No. 62/786,615, filed on Dec. 31, 2018, and titled "EMERGENCY EGRESS IN A BLENDED WING BODY AIRCRAFT," and U.S. Provisional Patent Application Ser. No. 62/787,101, filed on Dec. 31, 2018, and titled "Trailing Link Pivot Piston," respectively, which are incorporated by reference herein in their entirety.

FIELD OF THE INVENTION

The present invention generally relates to the field of aviation. In particular, the present invention is directed to an aircraft for commercial air travel and a method of manufacture.

BACKGROUND

Blended wing body aircraft exhibit a number of fuel and noise saving advantages. Reduced fuel consumption or fuel from renewable sources is increasingly important as the effects of global warming are becoming better understood. However, the aerodynamic properties of blended wing aircraft which facilitate these advances in fuel savings, when practically applied can preclude maximum passenger capacities within the most popular ranges currently in use by commercial airlines.

SUMMARY OF THE DISCLOSURE

In an aspect, an aircraft, the aircraft including a blended wing body and a single deck located within the blended wing body, wherein the single deck includes a passenger compartment located in a lateral middle portion of the blended wing body. The aircraft further comprising at least a cargo store located at least partially on or above the single deck. The aircraft further comprising a landing gear, wherein the landing gear includes at least a nose gear and at least a main gear located aft of the at least a nose gear, wherein one or more of the at least a nose gear and the at least a main gear occupies a gear housing that overlaps with a plane coincident with at least a portion of the single deck.

In another aspect, a method of manufacture for an aircraft for commercial air travel, the method including receiving a blended wing body, locating a single deck within the blended wing body, locating a passenger compartment in a laterally middle portion of the blended wing body, locating at least a cargo store at least partially on or above the single deck, locating at least a nose gear, and locating at least a main gear aft of the nose gear, wherein one or more of the at least a nose gear and the at least a main gear occupies a gear housing that overlaps with a plane coincident with at least a portion of the single deck.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
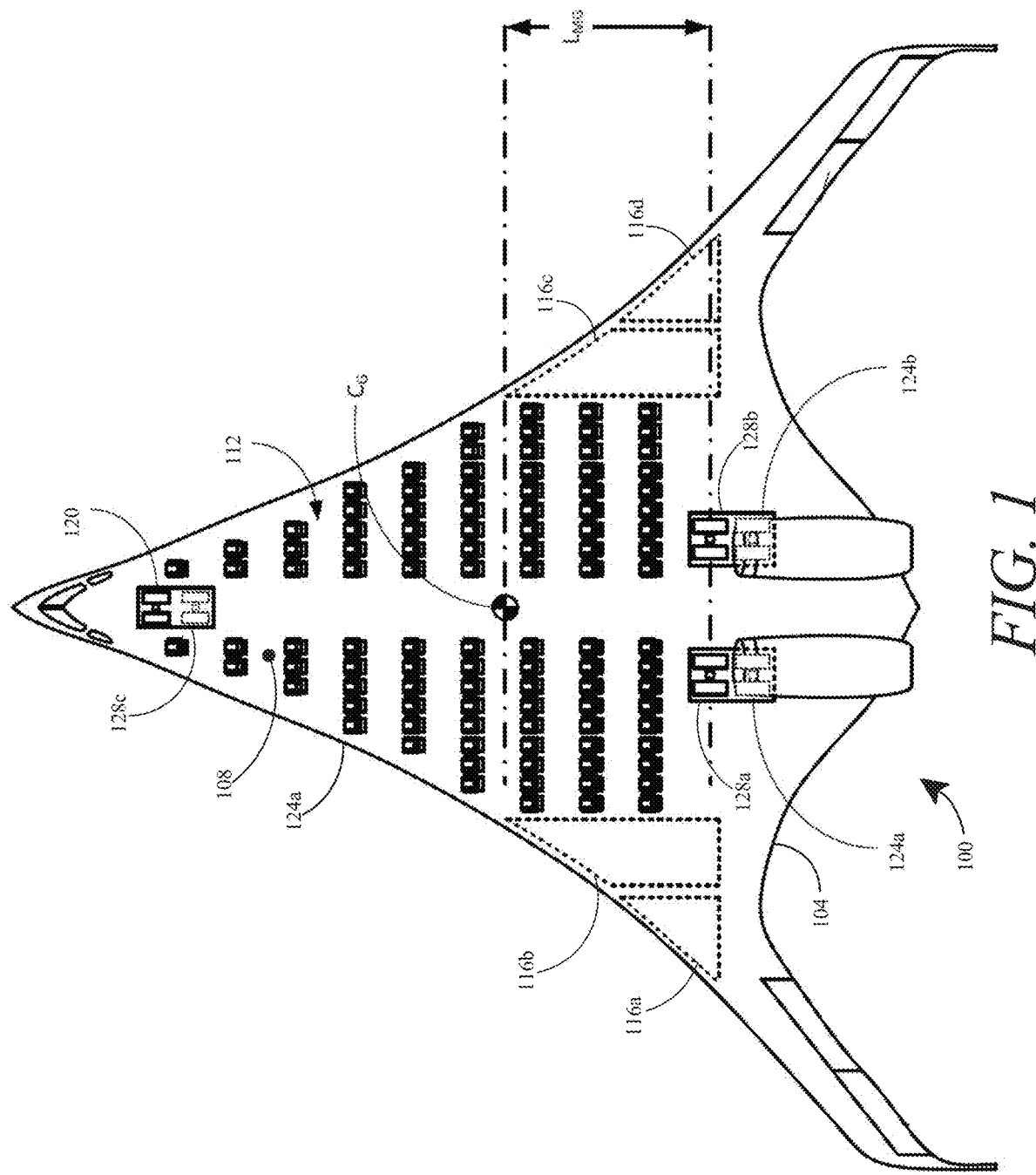
FIG. 1 is a plan view illustration of an exemplary aircraft.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an aircraft for commercial air travel and a method of manufacture. In an embodiment, aircraft may include a single deck allowing a minimum height of the aircraft. With minimum height a blended wing aircraft may be configured with a passenger storage compartment of a size comparable to current single-aisle commercial aircraft (e.g., Boeing 737 and Airbus A320).

Aspects of the present disclosure can also be used to manufacture blended wing body aircraft for commercial air travel. This is so, at least in part, because single-aisle commercial aircraft are the most popular size of aircraft for commercial airliners.

Aspects of the present disclosure allow for placement of landing gear fore and aft of a passenger compartment, in order to allow for a single deck passenger compartment to be used without interference with landing gear. Exemplary embodiments illustrating aspects of the present disclosure are described below in the context of several specific examples.

Today the single-aisle market for commercial air travel is dominated by the Boeing 737 and the Airbus A320. Boeing's 2016 market outlook predicts the single-aisle market will constitute 71% of sales in the 2016-2035 timeframe. Adding the 6% estimate for regional jet demand shows over 75% of total airline demand will come from the regional and single-aisle markets. These aircraft are in extraordinary demand and both manufacturers have near decade-long backlogs despite being older models. For instance, 737 first flight was in 1967 and A320 first flight was in 1987. Blended wing body aircraft may be capable of satisfying new market and regulatory expectations for increased fuel efficiency and reduced noise pollution. However, it has long been believed that because of limitations on fuselage shape that blended wing body aircraft may only be made for commercial air travel with two decks, requiring a much greater number of passengers than is desired by the current commercial air travel market.

In some embodiments a blended wing body aircraft may address the most pressing issues in today's Airliner fleet including new stringent emissions and noise standards from ICAO, operating cost, maintenance cost, and the newest problem—declining passenger comfort. According to some embodiments, aircraft described herein may provide any number of a multitude of improvements to air transport, for instance an airframe that shields community from most of engine noise, supersonic flow above cabin which prevents forward-radiated noise from entering the cabin, nacelles which are protected from ground handling equipment eliminating intake and exhaust hazards for ground personnel, thrust reversers that do not blank stabilizing surfaces which is a major problem for today's transports on icy runways, fuel tanks that are totally protected from rotor-burst, a pressure vessel and passenger compartment that are totally protected from rotor-burst, a primary wing structure is largely protected from rotor-burst, wingtip-stall that is much improved as the elevons reduce air load near stall, maneuver-loads on the wing that are reduced as the elevons are loaded opposite to the wing load during flight maneuvers, engine inlets which are protected from stall at high angle-of-attack as the airframe directs the flow to the inlet, a majority of the center-body that is stall-free up to and beyond wing stall, a mid-span planform kink that is stall critical to protect the wingtips from stall and the engines from distortion, passenger cabin loading, unloading, and emergency egress that are faster due to multiple short aisles, a ditching stability and integrity that are improved by a large belly surface, traditional tails and associated systems are eliminated, entire high lift flap system is removed, no control surfaces are located behind the wing where they are vulnerable to stalled wakes, and a wing shape and lack of tails reduces the size of the ice protection system.

According to some embodiments, a small blended wing body (BWB) aircraft, suitable for addressing the market needs presently met by the Boeing 737, must have a single deck. To date, commercial BWB aircraft have been configured with two decks for optimal packaging. Commonly, a lower deck may be used for cargo and landing gear stowage. In some embodiments, a single-deck BWB aircraft may locate landing gear and cargo elsewhere if the lower deck is to be removed from the aircraft. In some embodiments, a single-deck BWB may locate its main gear in a traditional location. In this embodiment, gear wells (i.e., hear housings) may occupy large volumes within a passenger compartment (i.e., cabin). In some cases, these gear wells may be equal in size to all lavatories and galleys combined. It is for this reason that single-deck BWB aircraft configurations have long been considered infeasible and uneconomical.

There are two fundamental conflicts between main landing gear and its payload compartment. A lateral conflict comes from gear track limit for Group-III airports. If main gear were to be located outboard of all payload compartments (e.g., cabin and cargo), gear track would exceed Group-III limit for future growth models. If main gear were located between cabin and cargo compartments, center-body would need to grow in size adding weight and drag. Main gear must also be near a longitudinal center of gravity (CG) to rotate for takeoff. Moving main gear behind cabin in some cases may be very desirable as this space is typically unused. Unfortunately, in some cases, this gear location is too far aft and may prevent takeoff rotation, when using conventional landing gear technology. This is why, present BWB aircraft locate gear wells in a second lower cargo deck near the aircraft CG below the payload compartment.

According to some embodiments, an aircraft having a blended wing body may be developed that can carry a maximum of between about 100 passengers and 300 passengers on a single deck, as a regional jetliner. In some cases, technology enabling blended wing body aircraft of this size includes landing gear and emergency egress advances, which are disclosed in Non-provisional application Ser. No. 16/181,687 filed on Nov. 6, 2018 and entitled "TILTING LANDING GEAR SYSTEMS AND METHODS," Non-provisional application Ser. No. 16/726,765 filed on Dec. 24, 2019 and entitled "EMERGENCY EGRESS IN A BLENDED WING BODY AIRCRAFT," and Non-provisional application Ser. No. 16/730,754 filed on Dec. 30, 2019 and entitled "TILTING LANDING GEAR SYSTEMS AND METHODS," the entirety of each of which is incorporated herein by reference.

In the following description, for the purposes of explanation, numerous specific details are set forth in order to provide a thorough understanding of the present invention. For purposes of description herein, relating terms, including "upper," "lower," "left," "rear," "right," "front," "vertical," "horizontal," and derivatives thereof relate to embodiments oriented as shown for exemplary purposes in FIG. 6. Furthermore, there is no intention to be bound by any expressed or implied theory presented in this disclosure.

Referring now to FIG. 1, a plan view of an exemplary aircraft 100 for commercial air travel is illustrated. As used in this disclosure, "commercial air travel" is a mode of transport where non-pilot passengers are conveyed by way of an aircraft. Aircraft may include a blended wing body 104. Further disclosure related to exemplary aircraft and blended wing bodies is described in detail below, for example with reference to FIG. 6.

With continued reference to FIG. 1, a single deck 108 may be located within blended wing body 104. As used in this disclosure, a "deck" on an aircraft is platform upon which one or more of passengers and cargo may be stored. A single deck 108 may be contrasted with a two-deck configuration analogously to a single-story house contrasted to a two-story house. In some cases, a single deck may have deviations in angle or height, just as a single-story house may have rooms in which one steps-up or steps-down in when entering. For example, in some cases, a single deck 108 may include multiple bays (e.g., 2 bays, 3 bays, 4 bays, 5 bays, and the like). Each of the multiple bays may have a floor which is not in plane with another bay. Furthermore, in some cases, a single deck 108 may not be entirely of a single plane or angle. For example, single deck 108 may have slight grade introduced in one or more portions. Slight grade in single deck 108 may match or parallel an outer mold line of aircraft. While a single deck 108 need not be comprised of a single plane, a single deck 108 may be characterized by its not having another deck directly above or below it. In some cases, single deck 108 may include a passenger compartment 112. As used in this disclosure, a "passenger compartment" is an area within which passengers may be seated during flight. In some cases, passenger compartment may be located in a lateral middle portion of blended wing body 104. As used in this disclosure, a "lateral" direction of an aircraft may refer to a direction running from wing tip to wing tip. Lateral direction may be substantially orthogonal to a nose to tail direction. In some embodiments, passenger compartment 112 may additionally be configured to have a maximum passenger transport capacity substantially within a range of about 5 and about 500 passengers. As used in this disclosure, a "maximum passenger transport capacity" is a number of passengers that may be conveyed within the passenger compartment. In some cases, maximum passenger transport capacity may be a function of regulatory and/or market constraints, for example on seating row pitch or seat width. In some embodiments, maximum passenger transport capacity may be substantially within a range of about 120 and about 300 passengers. In some cases, such as business jet configurations, a single deck 108 may transport far fewer passengers than maximum passenger transport capacity due to wide set setting and accommodations. For instance, in some cases, business jet configuration can have a maximum passenger transport capacity that is 10-20 times less than a maximum passenger transport capacity for the same aircraft configured for commercial air travel.

With continued reference to FIG. 1, a single deck 108 may additionally include at least a cargo store 116a-d. As used in this disclosure, a "cargo store," also referred to as a "cargo hold" is an area within which a payload can be stored. For example, without limitation payload may include without limitation passenger check baggage. In some cases, at least a cargo 116a-d store may be located laterally outside the passenger compartment 112. In some cases, at least a cargo store 116a-d may be only partially atop single deck 108, for example see FIG. 3. In some embodiments, at least a cargo store 116a-d may be at least partially located substantially within a wing portion of blended wing body 104. As used in this disclosure, a "wing portion" of a blended wing body is a portion of the blended wing body includes the wing. In some embodiments, at least a cargo store 116a-d may be at least partially located substantially within a transitional portion of blended wing body 104. As used in this disclosure, a "transitional portion" of a blended wing body is a portion of the blended wing body which includes a transition between wing and body. In some cases, a single deck 108 configuration permits cargo and/or passenger storage only on single deck 108. For example, passenger compartment 112 may not be located above a cargo store (or another passenger store) as is common on many commercial airliners.

With continued reference to FIG. 1, aircraft 100 may additionally include a landing gear. As used in this disclosure, "landing gear" is a flight component that makes contact with the earth during take-off and/or landing. For instance, landing gear may include without limitation wheels, tires, skis, floats, and the like. In some cases, landing gear may include at least a nose gear 120. As used in this disclosure, "nose gear" is forward most landing gear. Typically, nose gear is located in nose of aircraft and is thus referred to as nose gear. In some cases, at least a nose gear 120 may be located substantially forward of the single deck 108. Landing gear may additionally include at least a main gear 124a-b. As used in this disclosure, "main gear" is landing gear located aft of nose gear. In some cases, main gear may include substantially two landing gear assemblies and nose gear may include substantially one landing gear assembly, although any number and arrangement of landing gear is possible. In some cases, at least a main gear 124a-b may be located substantially aft of single deck 108. In some cases, one or more of at least a nose gear 120 and at least a main gear 124a-b occupies a gear housing 128a-c. As used in this disclosure, a "gear housing" is a location within a fuselage wherein landing gear is housed. Commonly landing gear is retractable and gear housing is a compartment into which the landing gear retracts, for instance during flight. In some cases, one or more of nose gear 120, main gear 124a-b, and gear housing 128a-c overlap with a plane coincident with at least a portion of single deck 108, for example see FIG. 2. Additional disclosure relating to landing gear may be found in Non-provisional application Ser. No. 16/181,687 filed on Nov. 6, 2018, and entitled "TILTING LANDING GEAR SYSTEMS AND METHODS," and Non-provisional application Ser. No. 16/730,754 filed on Dec. 30, 2019, and entitled "TILTING LANDING GEAR SYSTEMS AND METHODS," the entirety of each of which is incorporated herein by reference.

Figure 2:
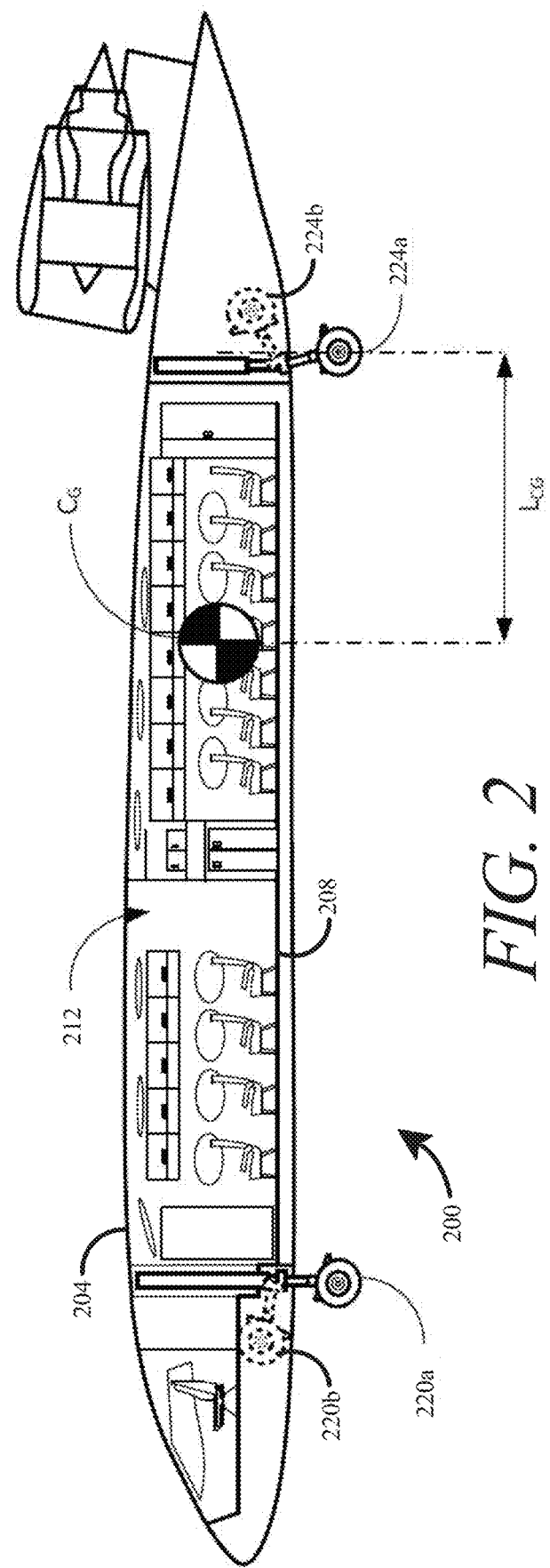
FIG. 2 is a side view illustration of an exemplary aircraft.

Referring now to FIG. 2, an exemplary aircraft 200 is illustrated in side-view. Aircraft 200 may include a blended wing body 204. Aircraft 200 may include a single deck 208. Single deck 208 may include a passenger compartment 212. As can be seen in FIG. 2, in some cases, nose gear 220a-b may be located substantially forward of single deck 208; and/or main gear 224a-b may be location substantially aftward of the single deck 208. In some cases, passenger compartment 212 may be located substantially between nose gear 220a-b and main gear 224a-b. FIG. 2 shows nose gear 220a-b in an extended position 220a as well as a retracted position 220b. FIG. 2 also shows main gear 224a-b in an extended position 224a as well as a retracted position 224b. As described above, in some cases, when retracted, one or more of nose gear 220b and main gear 224b may be located within a gear housing.

Continuing with reference to FIG. 2, a plane coincident with at least a portion of single deck 208 may be conceptualized as a horizontal line, coincident with the single deck 208, extending across the FIG. In some embodiments, one or more of nose gear 220a-b, main gear 224a-b, and gear housing may be located within a position that intersects or otherwise overlaps with plane coincident with at least a portion of single deck 208. Said another way, in some cases, at least a portion of one or more of nose gear 220a-b, main gear 224a-b, and gear housing may be at substantially a same height as single deck 208.

Figure 3:
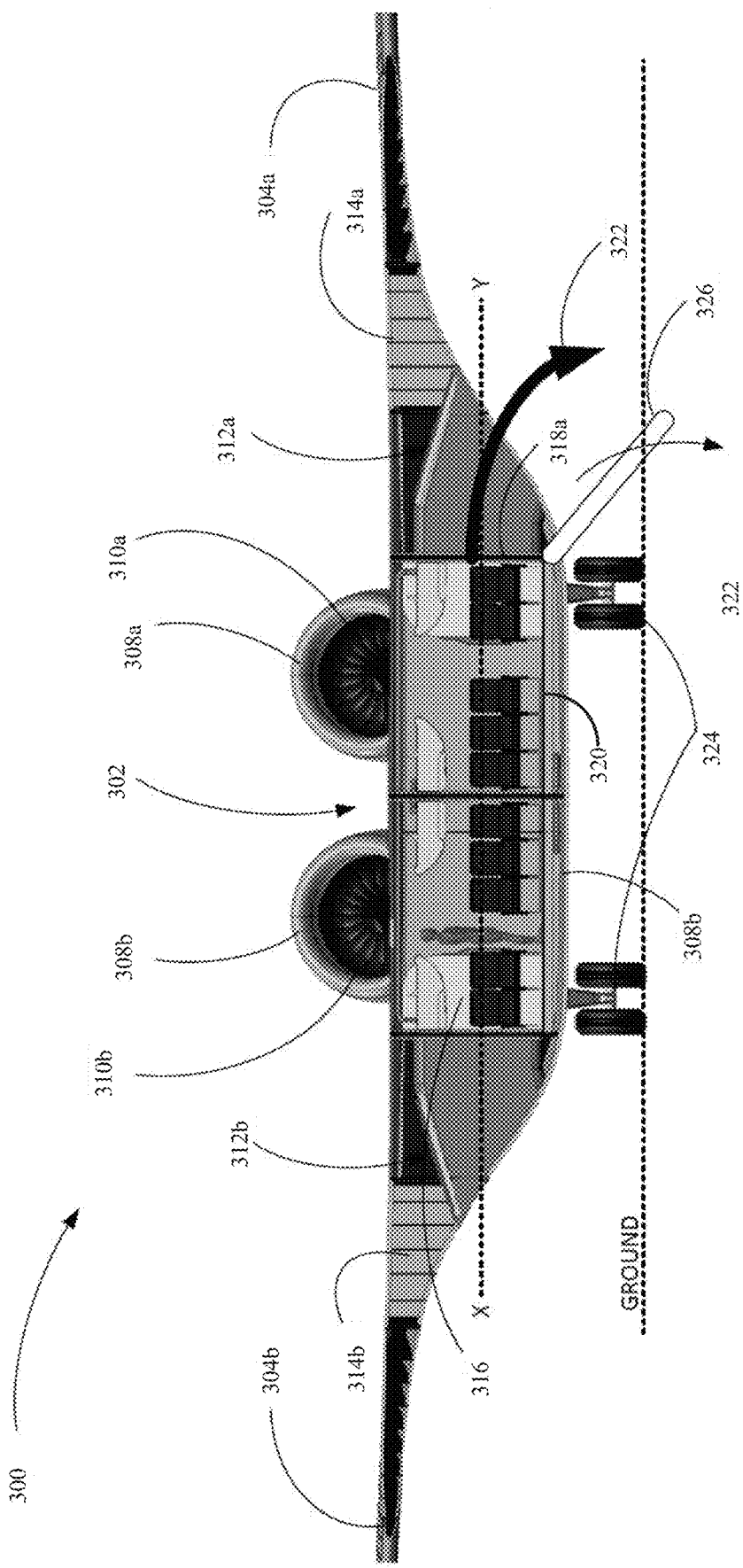
FIG. 3 illustrates an exemplary aircraft having an exemplary egress in a front view.

FIG. 3 is an exemplary front-view illustration of an exemplary aircraft 300. In some cases, aircraft may have a high wing geometry, as shown. Aircraft 300 may have a blended wing body 302. The blended wing body 302 may include a port wing 304a and a starboard wing 304b. Blended wing body 302 and wings 304a-b may have positive sweep angles. Aircraft 300 may further include a nacelle 308a that houses a port main engine 310a and a nacelle 308b that houses a starboard main engine 310b. Aircraft 300 may have a single deck 320.

With continued reference to FIG. 3, aircraft 300 may include a port cargo hold 312a and a starboard cargo hold 312b. In some examples, cargo holds 312a-b are pressurized cargo holds designed to hold passenger cargo (suitcases and the like) as well as, in some examples, revenue cargo and/or animal transport. Aircraft 300 may further include a port fuel tank 314a and starboard fuel tank 314b. It should be noted that the size and location of various structures, such as the cargo holds 312*a-b*, as well as the fuel tanks 314*a-b* are illustrated merely as an example, as other sizes, locations, and configurations may be used and are considered to be within the scope of the presently disclosed subject matter. Aircraft 300 may include a passenger compartment 316, which also may be referred to herein as a cabin 316.

With continued reference to FIG. 3, aircraft 300 may include an exit 318*a*, which may be used as an emergency egress route. Aircraft 300 may include other exits that are not illustrated in FIG. 3. As illustrated, Aircraft 300 may have a single deck 320 (i.e., single passenger and cargo floor). Further, aircraft 300 may have high wing geometry, as illustrated by wings 304*a-b* above centerline XY, which is approximately a center of height of aircraft 300 above a single deck 320 of the aircraft 300.

With continued reference to FIG. 3, in some cases, high wing geometry and location of exit 318*a* may increase a length of an exit tunnel significantly. Alternatively, with a low wing geometry where wings are at or near centerline XY, one or more of exits from aircraft may pass through at least a part of a wing of the aircraft. In some cases, a need to pass through a wing, for example with a low wing geometry, can increase a length of travel from a main cabin of aircraft to the outside, as the passenger needs to travel at least partially through the wing.

In FIG. 3, aircraft 300 has a high wing geometry, which in some examples significantly shortens length of travel from cabin 316 to outside, because passenger does not need to travel through wing, as it is above an egress path 322. Further, using a high wing geometry configuration, egress path 322 may be closer to ground. In some examples, with landing gear 324 up (raised or within blended wing body 302 of aircraft 300), egress path 322 may be near ground level. With landing gear 324 down (lowered or below blended wing body 302 of aircraft 300), egress path 322 may be 5 or 6 feet above the ground (i.e., height of the landing gear 324). In some examples, an exit door 326 may be configured to provide a ramp to assist passengers in exiting aircraft 300. Exit door 326, or another structure of aircraft 300, may also include an inflatable slide.

Referring now to FIG. 3, in some cases, cargo holds 312*a-b* may be located only partially over single deck 320, for instance where aircraft 300 has a high wing geometry. In some cases, cargo holds 312*a-b* may be located on another deck, for instance substantially above single deck 320. In some cases, cargo holds 312*a-b* may have a pitched deck. For instance, in some embodiments, cargo holds 312*a-b* may have a non-horizontal deck which is at least partially defined by geometry of blended wing body 302. In some cases, cargo holds 312*a-b* may include storage systems, for instance shelving and/or cabinets to maximize volumetric storage efficiency. Volumetric storage efficiency may be determined as approximately a total volume of stored cargo divided by a total volume of cargo hold 312*a-b*. In some cases, cargo holds 312*a-b* are substantially outboard, i.e., laterally outward toward wings, of passenger compartment 316.

Figure 4:
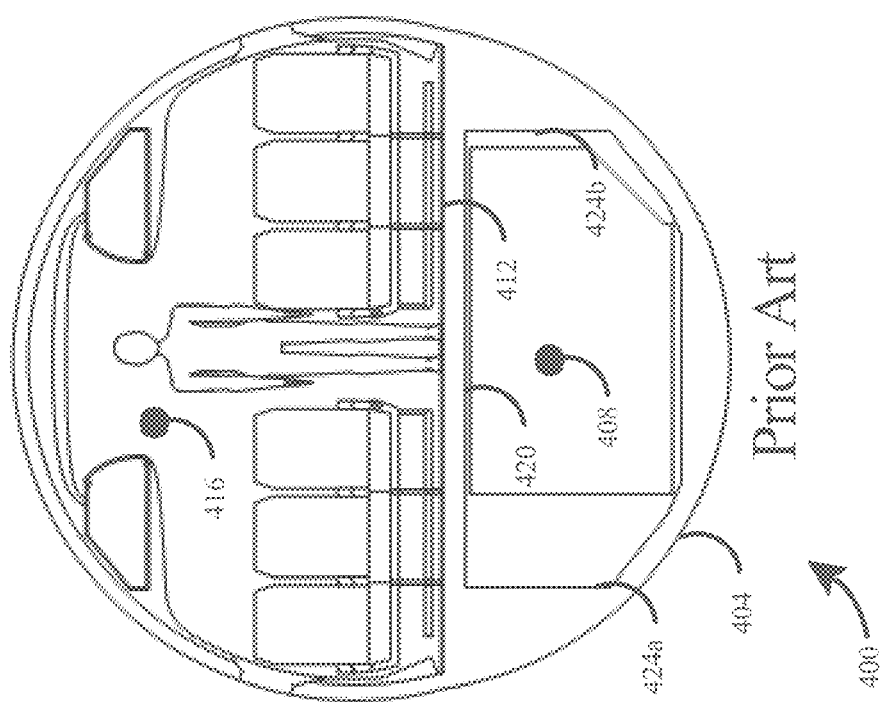
FIG. 4 is a front view of an exemplary tube wing aircraft.

Referring now to FIG. 4, an exemplary front view of an exemplary conventional single aisle aircraft 400 is illustrated. Exemplary aircraft 400 may employ a tubular fuselage 404. Aircraft may locate cargo in a cargo hold 408 below floor (i.e., single deck) 412. In some cases, a passenger compartment 416 may be located atop single deck 412. In some cases, passengers ride within passenger compartment 416 in upper portion of fuselage. Conventionally, floor structure of tube-wing aircraft may be substantial. For example, floor 408 may consist of a series of transverse beams ("floor beams") 420 supported at their outboard ends by tubular fuselage structure 404. In some cases, floor beams 420 may be supported by columns 424*a-b*, for instance just outboard of cargo bay 408. In some embodiments, columns 424*a-b* may transmit floor beam 420 loads to tubular fuselage 404 and may reduce floor beam weight by reducing a free span of the floor beams. Floor beams 420 may be surfaced by a combination of longitudinal elements, usually seat tracks, and floor panels that span between the seat tracks. In some embodiments, lateral elements, for example attached to a top of floor beams 420, support floor panels on their fore and aft edges. In some cases, passenger seat legs have a "button" that is captured within a slot in seat track. In some embodiments, fore-aft location of seats may be indexed and restrained by regularly spaced cutouts in the seat track. In some cases, seat tracks carry load of floor panels longitudinally to transverse floor beams 420. As a result, seat tracks may be shaped as I beams. In some embodiments, modern floor panels are generally a sandwich panel consisting of carbon-epoxy face sheets and a honeycomb core. In some cases, floor panel thickness may be about 0.400 inches. Floor panels may be fastened to seat tracks with screws through recessed inserts in the floor panel. In some embodiments, an upper surface of each floor panel may be flush with an upper surface of a seat track. In some cases, a lower surface of each floor panel may rest on lateral extensions of seat track. As a result, in some embodiments a smooth floor surface from wall-to-wall may be achieved, while allowing seat track slot access from above. In some cases, an aircraft having a blended wing body may preclude conventional flooring as described in reference to FIG. 4 above, for instance in cases where the aircraft employs a single-deck configuration.

Figure 5:
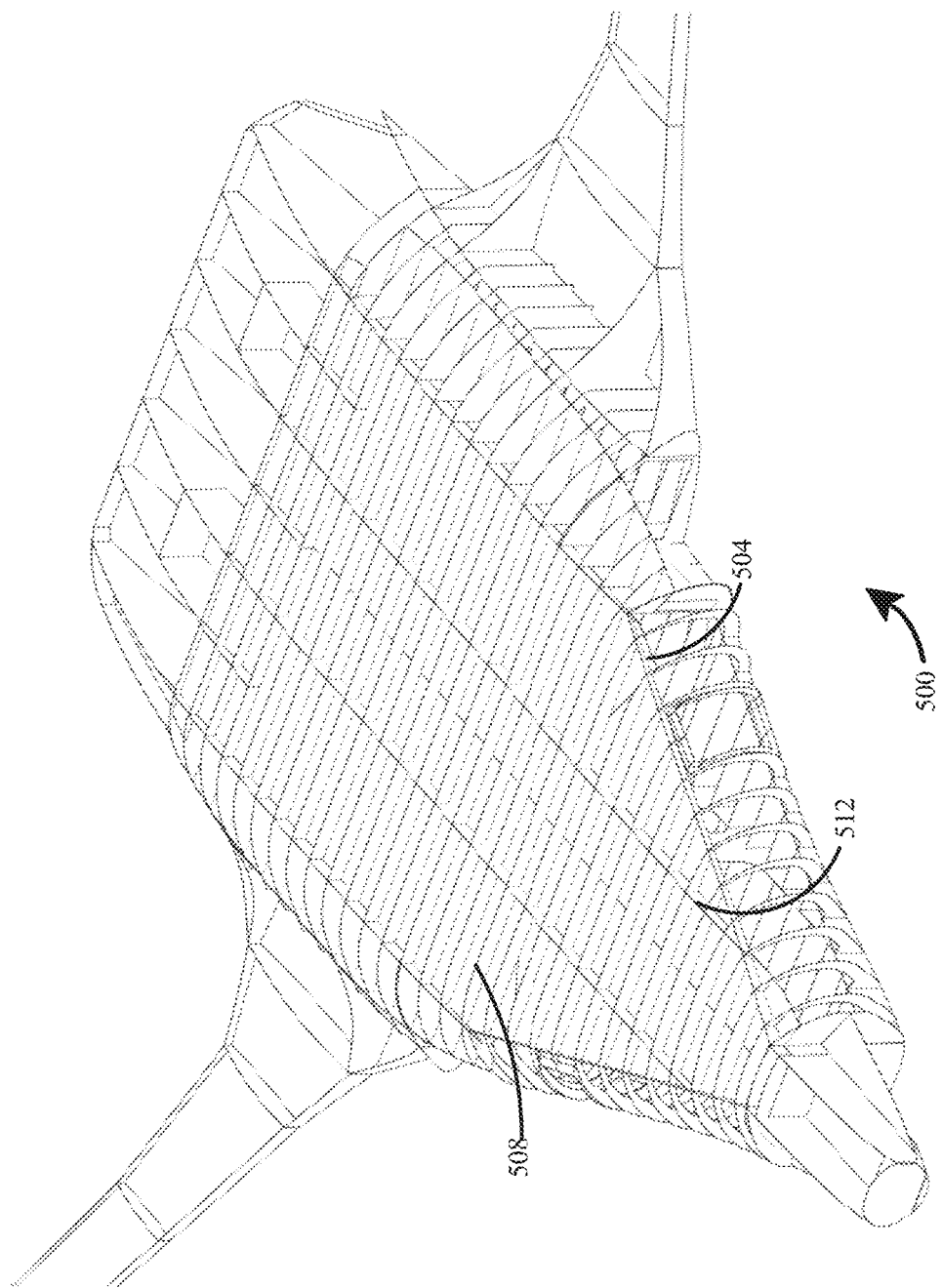
FIG. 5 is an exemplary view illustrating an exemplary structural floor for a blended wing body aircraft.

Referring now, to FIG. 5, an exemplary view showing a bottom of a blended wing body aircraft 500 is illustrated. In some embodiments, a BWB cannot practically use a conventional cabin floor structure. In some cases, this may be because a BWB may have little depth between finished floor surface 504 (top of floor panel) and a lower outer mold line (OML) of BWB. Furthermore, in some cases, a conventional floor structure may span between cabin walls, which may be supported by columns to an OML structure. As depth between floor and lower OML may be relatively small in a single-deck configuration, a conventional floor structure may be likely to be very inefficient and heavy. In some embodiments, floor structure 504 of a BWB aircraft may support both a payload (multiplied by a maximum g-load) and a cabin pressurization load. In some cases, cabin pressure load may be far greater than payload weight. As a result, in some cases, floor structure 504, may resist far greater vertical loads and therefore may need to be far stronger than typical airliner floor systems.

With continued reference to FIG. 5, in some embodiments, OML structure and floor structure 504 may form an integrated structure. In this arrangement, floor structure 504 may function as a sandwich structure. For instance, a structural face of floor structure 504 may be considered an upper sandwich skin; and a lower OML may be considered a lower sandwich skin. In some cases, cabin and or cargo store walls may terminate lateral edges of sandwich structure and transfer their loads to airplane 500 as a whole. In some embodiments, transverse beams 508 may function as one or more of beams and/or shear webs, for instance by linking an upper sandwich skin (floor structure 504) and lower sandwich skin (lower OML). In some cases, additional longitudinal beams 512 may transmit shear longitudinally. FIG. 5 is provided by way of an example, it is likely that other embodiments, will include far more transverse elements 508 and longitudinal elements 512 than shown.

Still referring to FIG. 5, in some embodiments, structural skin may be preferably flat and without discontinuities, such as without limitations long grooves. A competing concern is conventional seat tracks that may be necessary in any practical solution for a commercial airliner. In some cases, rather than being integral to floor 504 seat tracks may be fastened to the structural floor 504 and/or longitudinal elements 512, for instance between the floor 504 and lower OML. In some embodiments, upward protrusion of seat tracks may be "filled in" to provide smooth finished floor surface. In some cases, filling in seat track protrusions may be accomplished with a sandwich floor panel, as described with reference to FIG. 4. For example, one or more floor panels may be conventionally fastened to seat tracks or supported at one or more locations "in the field" so that the floor panel load is transferred to much-stronger integrated floor system 504.

Figure 6:
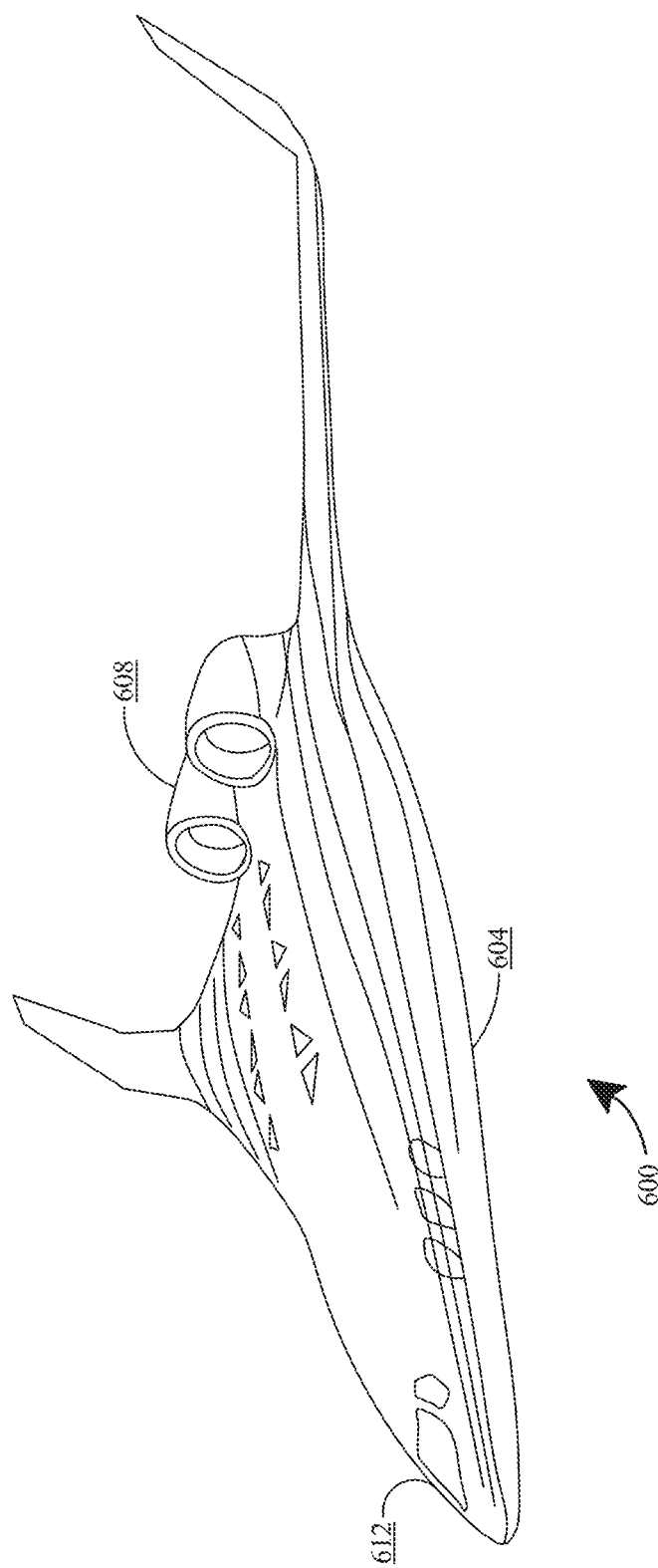
FIG. 6 is a schematic of an exemplary blended wing aircraft.

Referring to FIG. 6, an exemplary blended wing aircraft 600 is illustrated. Aircraft 600 may include a blended wing body 604. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft at the leading edge of the wings. For example, a BWB 604 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 604 design may or may not be tailless. One potential advantage of a BWB 604 may be to reduce wetted area and any accompanying drag associated with a conventional wing-body junction. In some cases, a BWB 604 may also have a wide airfoil-shaped body, allowing entire aircraft to generate lift and thereby facilitate reduction in size and/or drag of wings. In some cases, a BWB 604 may be understood as a hybrid shape that resembles a flying wing, but also incorporates features from conventional aircraft. In some cases, this combination may offer several advantages over conventional tube-and-wing airframes. In some cases, a BWB airframe 604 may help to increase fuel economy and create larger payload (cargo or passenger) volumes within the BWB. In some cases, blended wing body 604 may have a maximum depth of centerbody substantially within a range of about 15 to about 35 feet. As used in this disclosure, a "maximum depth of centerbody" of a blended wing body is a distance from an extreme bottom of the blended wing bottom to an extreme top of the blended wing body, not including external flight components, such as without limitation landing gear and nacelles. In some cases, blended wing body 6 may have a wingspan substantially within a range of about 125 to about 225 feet. As used in this disclosure, a "wingspan" of a blended wing body is a distance between an extreme tip of both wings of the blended wing body. In some cases, blended wing body 604 may have a maximum length substantially within a range of about 75 to about 150 feet. As used in this disclosure, a "maximum length" of a blended wing body is a distance from an extreme forward position and an extreme aftward position of the blended wing body, not including external flight components, such as without limitation landing gear and nacelles.

Still referring to FIG. 6, in some cases, blended wing body 604 may have a thickness to chord ratio configured for transonic flight. As used in this disclosure, a "thickness to chord ratio" a blended wing body is a function of a height of the blended wing body at a certain location divided by a length of the blended wing body at the certain location. In some cases, thickness to chord ratio may compare a maximum vertical thickness (i.e., maximum depth of centerbody) of a wing to its chord (i.e., maximum length). Thickness to chord ratio may be a key measure of performance of a wing planform or blended wing body, including at transonic speeds. As used in this disclosure, "transonic flight" refers to flight at a transonic speed. As used in this disclosure, "transonic speed" is a speed that is approaching a speed of sound and is likely to result in generation of air flows at both subsonic and supersonic speeds. For example, in some cases, transonic speed may include speeds no less than about Mach 0.5 and no more than about Mach 1.5. In some cases, transonic airspeeds see a rapid increase in drag from about Mach 0.8. As a result, in some cases fuel costs associated with drag from transonic air flow that limits airspeed. In some embodiments, swept wings may be used to reduce drag at transonic speeds. In some case, BWB 604 may be configured for one or more of subsonic speeds (e.g., no greater than about Mach 1.0), transonic speeds (e.g., between about Mach 0.5 and about Mach 1.5), and supersonic speeds (e.g., no less than Mach 0.9).

BWB 604 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats. In some cases, and generally speaking, for an airline, adding one extra seat in a 100-seat transport improves revenues 1%, but costs only 0.5% in additional fuel which translates into about 0.2% in increased operating cost. This simple math explains present motivations to fit more seats in airliners. In some cases, as number of seating rows often greatly out numbers number of seats per row, narrowing seats is not a feasible strategy. For instance, in some exemplary embodiments seats would need to be narrowed about 4 inches, or about 20%, to add another seat in a row. However, in some embodiments, adding an entire row to a 22-row airplane may only cost about 1.3 inches, or about 4%, in seat pitch. Little by little this pressure has created innovative thin seats, but also less comfort.

In some embodiments, one or both of passenger seat width and pitch may be varied dependent upon market needs. In some cases, nominal seat pitch may be about 34 inches. Alternatively, in some embodiments, another row may be added with a reduced seat pitch, for example a seat pitch of about 31 inches. Seat pitch range may be varied, for example within a range of about 24 inches (e.g., sub-economy on short-haul flights) to about 80 inches (e.g., first class on long-haul flights). In some cases, with reduced pitch and more rows, the added row may increase capacity about 5% to about 20% and fuel efficiency by between about 2% and about 10% per seat-mile. In some embodiments, seat width may also be varied in order to balance comfort and efficiency. Seat width may be varied for example within a range of about 15 inches (e.g., sub-economy on short-haul flights) to about 40 inches (e.g., first class on lang-haul flights).

BWB 604 offers new options to interior designers and configurators which may increase comfort for passengers and crew. First, sidewalls are vertical which may increase perception of space for passengers. Second, a cost of cabin width may be much less for a BWB than a cylindrical fuselage. Widening a BWB 604 center-body may not require an attendant increase in height, which is typically needed for cylindrical bodies. In some embodiments, this approximately halves costs for seat and aisle widths. For example, in some embodiments, cost of about 10% more seat width, or about 2 inches, may be less than about 0.9% in takeoff weight and cost only about 0.8% in fuel-burn. Furthermore, in some cases, increasing seat pitch may also be less expensive for a BWB 604 as reducing thickness to chord ratio generally benefits drag more than a similar reduction in a slender body aircraft's diameter to length-ratio. For example, in some embodiments, increasing seat pitch by about 10% increases takeoff weight by about 0.2% and fuel-burn by about 0.8%. In some embodiments, middle seats may have a width that is larger than non-middle seats. For example, at about 22 inches wide, a middle seat may have about 2 inches of extra width to help counter reduced private space normally experienced in the middle seat of today's airliners.

In some embodiments, BWB 604 may have other noteworthy advantages. First, in some cases, average ceiling height may be higher in BWB 604 compared with a conventional jetliner. This is the case, while in some embodiments, height at a rear bulkhead may be less. Both, average ceiling height and rear bulkhead height may be a result of airfoil shaped cabin. Second, in some embodiments, overhead baggage space may be about 50% greater, in a cabin of a BWB 604. In some cases, greater overhead baggage space may be advantageous as it may serve to reduce gate checking of bags. In some cases, gate checking may be disruptive to passenger flow and may require additional airline personnel to manage. In some embodiments, greatly reducing or even eliminating gate checking may further improve benefits of commercial air travel with an aircraft 600 having a BWB layout 604.

With continued reference to FIG. 6, BWB 604 of aircraft 600 may include a nose portion. A "nose portion," for the purposes of this disclosure, refers to any portion of aircraft 600 forward of the aircraft's fuselage 616. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. As used in this disclosure, a "cockpit" is a compartment for housing at least a pilot, for instance during flight. Cockpit may include one or more pilot controls configured to interface with at least a pilot for control of at least a flight component, for example by way of a flight controller. In some cases, cockpit may be located substantially above one or more of at least a nose gear and a plane coincident with at least a portion of single deck, for example as shown in FIG. 2. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 6, BWB 604 may include at least a structural component of aircraft 600. Structural components may provide physical stability during an entirety of an aircraft's 600 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars may be disposed in an aircraft's 600 structure, they may be so named A, B, C, and so on named from nose to tail. Pillars, like any structural element, may be disposed a distance away from each other, along an exterior of aircraft 600 and BWB 604. Depending on manufacturing method of BWB 604, pillars may be integral to frame and skin, comprised entirely of internal framing, or alternatively, may be only integral to structural skin elements. Structural skin will be discussed in greater detail below.

With continued reference to FIG. 6, BWB 604 may include a plurality of materials, alone or in combination, in its construction. At least a BWB 604, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 604 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 604 may additionally or alternatively use wood or another suitably strong yet light material for an internal structure.

With continued reference to FIG. 6, aircraft 600 may include monocoque or semi-monocoque construction. BWB 604 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e., above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 6, BWB 604 may include at least a fuselage. A "fuselage," for the purposes of this disclosure, refers to a main body of an aircraft 600, or in other words, an entirety of the aircraft 600 except for nose, wings, empennage, nacelles, and control surfaces. In some cases, fuselage may contain an aircraft's payload. At least a fuselage may comprise structural components that physically support a shape and structure of an aircraft 600. Structural components may take a plurality of forms, alone or in combination with other types. Structural components vary depending on construction type of aircraft 600 and specifically, fuselage. A fuselage 612 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 6, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 600. In some cases, a former form a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 600 when installed. In other words, former (s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 6, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 6, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction," vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 6, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 604. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

With continued reference to FIG. 6, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 600 is in its level flight orientation or sitting on ground. A post may act similarly to stringer in that it is configured to support axial loads in compression due to a load being applied parallel to its axis due to, for example, a heavy object being placed on a floor of aircraft 600. A beam may be disposed in or on any portion a fuselage that requires additional bracing, specifically when disposed transverse to another structural element, like a post, which would benefit from support in that direction, opposing applied force. A beam may be disposed in a plurality of locations and orientations within a fuselage as necessitated by operational and constructional requirements.

With continued reference to FIG. 6, aircraft 600 may include at least a flight component 608. A flight component 608 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 600 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 600. In some embodiments, at least a flight component 608 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 6, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 6, at least a flight component may be one or more devices configured to affect aircraft's 600 attitude. "Attitude," for the purposes of this disclosure, is the relative orientation of a body, in this case aircraft 600, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 600. A plurality of attitude datums may indicate one or more measurements relative to an aircraft's pitch, roll, yaw, or throttle compared to a relative starting point. One or more sensors may measure or detect an aircraft's 600 attitude and establish one or more attitude datums. An "attitude datum," for the purposes of this disclosure, refers to at least an element of data identifying an attitude of an aircraft 600.

With continued reference to FIG. 6, in some cases, aircraft 600 may include at least a pilot control. As used in this disclosure, a "pilot control," is an interface device that allows an operator, human or machine, to control a flight component of an aircraft. Pilot control may be communicatively connected to any other component presented in aircraft 600, the communicative connection may include redundant connections configured to safeguard against single-point failure. In some cases, a plurality of attitude datums may indicate a pilot's instruction to change heading and/or trim of an aircraft 600. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch," for the purposes of this disclosure refers to an aircraft's angle of attack, which is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down," when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, which is to say that when an aircraft rotates about its axis from its tail to its nose, and one side rolls upward, as in a banking maneuver. "Yaw," for the purposes of this disclosure, refers to an aircraft's turn angle, when an aircraft rotates about an imaginary vertical axis intersecting center of earth and aircraft 600. "Throttle," for the purposes of this disclosure, refers to an aircraft outputting an amount of thrust from a propulsor. In context of a pilot input, throttle may refer to a pilot's input to increase or decrease thrust produced by at least a propulsor. Flight components 608 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components, or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 6, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 608. At least a flight component 608 may include any propulsor as described herein. In embodiment, at least a flight component 608 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 6, at least a sensor may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat," for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 6, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor," for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 6, at least a flight component 608 may include wings, empennages, nacelles, control surfaces, fuselages, and landing gear, among others, to name a few. In embodiments, an empennage may be disposed at the aftmost point of an aircraft body 604. Empennage may comprise a tail of aircraft 600, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 600 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 600 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 604 aircraft 600 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g., length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 608 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 608 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 600. Such devices increase an effective aspect ratio of a wing without greatly increasing wingspan. Extending wingspan may lower lift-induced drag but would increase parasitic drag and would require boosting the strength and weight of the wing. As a result, according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 600 and pose a hazard to other aircraft. Minimum spacing requirements between aircraft at airports are largely dictated by hazards, like those from wake vortices. Aircraft are classified by weight (e.g., "Light," "Heavy," and the like)

often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 6, aircraft 600 may include an energy source. Energy source may include any device providing energy to at least a flight component 608, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing, and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 6, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 604 of aircraft 600, for example without limitation within a wing portion 612 of blended wing body 608. Aviation fuels may include petroleum-based fuels, or petroleum and synthetic fuel blends, used to power aircraft 600. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 600. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 6, modular aircraft 600 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 6, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 6 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 6, aircraft 600 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 6, aircraft 600 may include multiple flight component 608 sub-systems, each of which may have a separate energy source. For instance, and without limitation, one or more flight components 608 may have a dedicated energy source. Alternatively, or additionally, a plurality of energy sources may each provide power to two or more flight components 608, such as, without limitation, a "fore" energy source providing power to flight components located toward a front of an aircraft 600, while an "aft" energy source provides power to flight components located toward a rear of the aircraft 600. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 608. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 6, aircraft 600 may include a flight component 608 that includes at least a nacelle 608. For the purposes of this disclosure, a "nacelle" is a streamlined body housing, which is sized according to that which is houses, such as without limitation an engine, a fuel store, or a flight component. When attached by a pylon entirely outside an airframe 604 a nacelle may sometimes be referred to as a pod, in which case an engine within the nacelle may be referred to as a podded engine. In some cases, an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 600 partially or wholly enveloped by an outer mold line of the aircraft 600. At least a nacelle may be designed to be streamlined. At least a nacelle may be asymmetrical about a plane comprising the longitudinal axis of the engine and the yaw axis of modular aircraft 600.

With continued reference to FIG. 6, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 6, a motor may be connected to a thrust element. Thrust element may include any device or component that converts mechanical work, for example of a motor or engine, into thrust in a fluid medium.

Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 6, in nonlimiting embodiments, at least a flight component 608 may include an airbreathing engine such as a jet engine, turbojet engine, turboshaft engine, ramjet engine, scramjet engine, hybrid propulsion system, turbofan engine, or the like. At least a flight component 608 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojet. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 6, an aircraft 600 may include a flight controller. As used in this disclosure, a "flight controller" is a device that generates signals for controlling at least a flight component 608 of an aircraft 600. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 6, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 600 and/or computing device.

With continued reference to FIG. 6, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
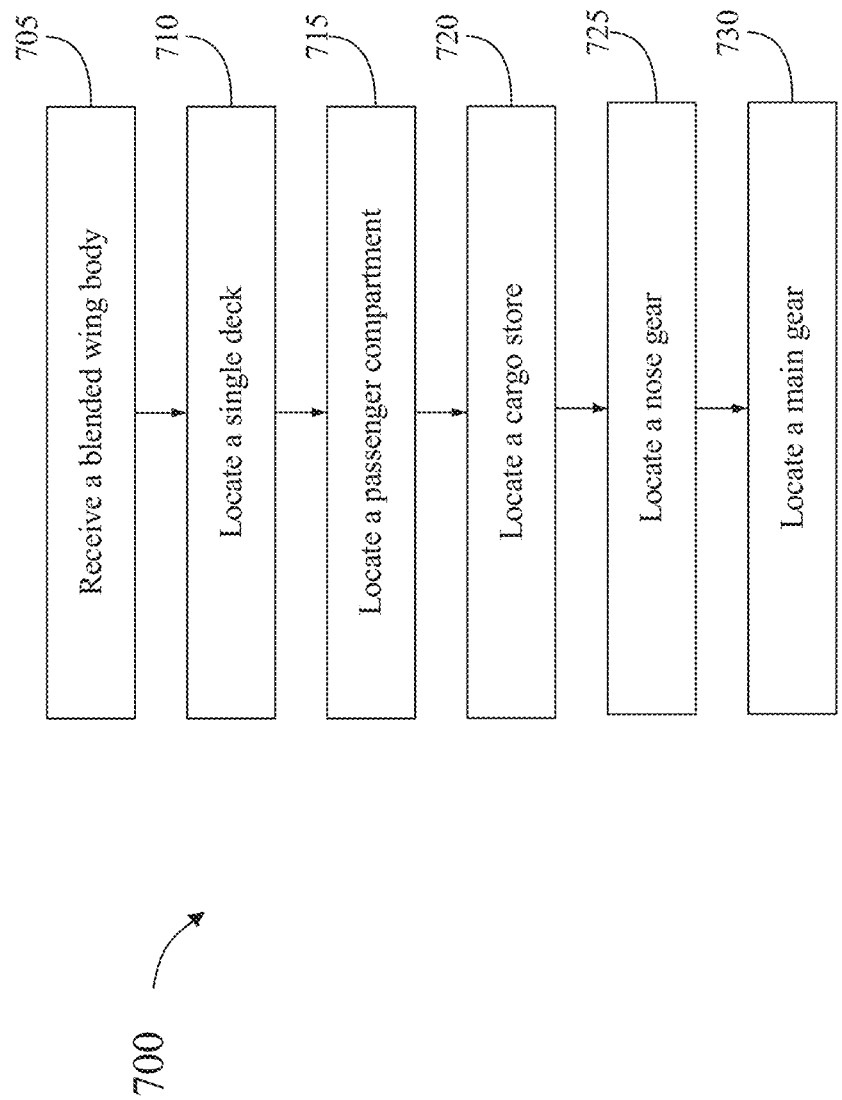
FIG. 7 is a flow diagram of an exemplary method of manufacture for an aircraft for commercial air travel.

Referring now to FIG. 7, a method 700 of manufacture for an aircraft for commercial air travel is illustrated by way of a flow diagram. At step 705, method 700 may include receiving a blended wing body. Blended wing body may include any blended wing body described in this disclosure, for example with reference to FIGS. 1-6. In some embodiments, blended wing body may have a maximum depth of centerbody substantially within a range of about 15 to about 35 feet. In some embodiments, blended wing body may have a wingspan substantially within a range of about 125 to about 225 feet. In some embodiments, blended wing body may have a length substantially within a range of about 75 to about 150 feet.

With continued reference to FIG. 7, at step 710, method 700 may include locating a single deck within blended wing body. Single deck may include any deck described in this disclosure, for example with reference to FIGS. 1-6.

With continued reference to FIG. 7, at step 715, method 700 may include locating a passenger compartment in a laterally middle portion of blended wing body. Passenger compartment may include any passenger compartment described in this disclosure, for example with reference to FIGS. 1-6.

With continued reference to FIG. 7, at step 720, method 700 may include locating at least a cargo store laterally outside passenger compartment. Cargo store may include any cargo store described in this disclosure, for example with reference to FIGS. 1-6. In some embodiments, step 720 may additionally include locating at least a cargo store substantially within a wing portion of blended wing body. Wing portion may include any wing portion described in this disclosure, for example with reference to FIGS. 1-6. In some embodiments, step 720 may additionally include locating at least a cargo store substantially within a transitional portion of blended wing body. Transitional portion may include any transitional portion described in this disclosure, for example with reference to FIGS. 1-6.

With continued reference to FIG. 7, at step 725, method 700 may include locating at least a nose gear. In some embodiments, step 725 may include locating at least a nose gear substantially forward of single deck. Nose gear may include any nose gear and/or landing gear described in this disclosure, for example with reference to FIGS. 1-6.

With continued reference to FIG. 7, at step 730, method 700 may include locating at least a main gear substantially aft of single deck. In some cases, one or more of at least a nose gear and at least a main gear may occupy a gear housing that overlaps with a plane coincident with at least a portion of single deck. Main gear may include any main gear and/or landing gear described in this disclosure, for example with reference to FIGS. 1-6. Gear housing may include any gear housing described in this disclosure, for example with reference to FIGS. 1-6.

Still referring to FIG. 7, in some embodiments, method 700 may additionally include locating a cockpit substantially above nose gear and plane coincident with at least a portion of single deck. Cockpit may include any cockpit described in this disclosure, for example with reference to FIGS. 1-6.

Still referring to FIG. 7, in some embodiments, method 700 may additionally include configuring passenger compartment to have a maximum passenger transport capacity substantially within a range of about 50 and about 500 passengers. Maximum passenger transport capacity may include any maximum passenger transport capacity described in this disclosure, for example with reference to FIGS. 1-6. In some cases, maximum passenger transport capacity may be substantially within a range of about 120 and about 300 passengers.

Still referring to FIG. 7, in some embodiments, method 700 may additionally include configuring a thickness to chord ratio of blended wing body for transonic flight. thickness to chord ratio may include any thickness chord ratio described in this disclosure, for example with reference to FIGS. 1-6. Transonic flight may include any transonic flight described in this disclosure, for example with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
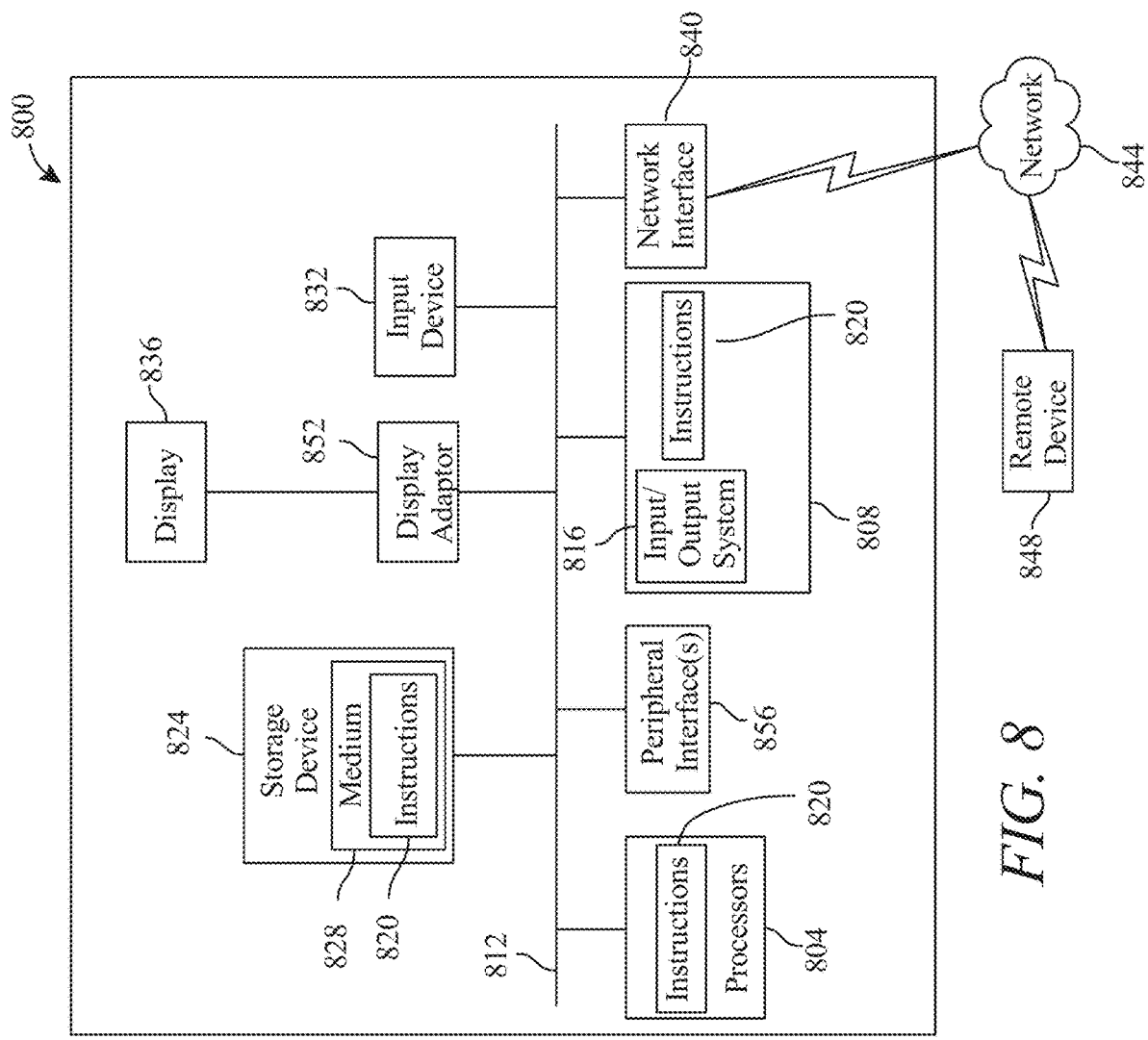
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An aircraft, the aircraft comprising:
 a blended wing body;
 a single deck located within the blended wing body, wherein the single deck includes a passenger compartment located in a lateral middle portion of the blended wing body;
 at least a cargo store located at least partially on or above the single deck; and
 a landing gear, wherein the landing gear includes:
  at least a nose gear; and
  at least a main gear located:
   substantially aft of the single deck; and
   aft of the at least a nose gear, wherein one or more of the at least a nose gear and the at least a main gear occupies a gear housing that overlaps with a plane coincident with at least a portion of the single deck.

2. The aircraft of claim 1, further comprising a cockpit located substantially above the nose gear and the plane coincident with at least a portion of the single deck.

3. The aircraft of claim 1, wherein the at least a cargo store is located at least partially within a transitional portion of the blended wing body.

4. The aircraft of claim 1, wherein the at least a cargo store is located at least partially above a centerline, wherein the centerline is a center of a height of the aircraft above a floor of the aircraft.

5. The aircraft of claim 4, further comprising a wing portion, wherein the wing portion is located above the centerline.

6. The aircraft of claim 1, wherein the at least a main gear comprises at least two landing gear assemblies.

7. The aircraft of claim 1, wherein the at least a cargo store comprises a port cargo store and a starboard cargo store.

8. The aircraft of claim 1, further comprising at least an exit, wherein the at least an exit is configured to allow egress from the passenger compartment.

9. The aircraft of claim 1, wherein the at least a cargo store is located at least partially within a wing portion of the blended wing body.

10. A method of manufacture for an aircraft for commercial air travel, the method comprising:
 receiving a blended wing body;
 locating a single deck within the blended wing body;
 locating a passenger compartment in a laterally middle portion of the blended wing body;
 locating at least a cargo store at least partially on or above the single deck;
 locating at least a nose gear; and
 locating at least a main gear:
  substantially aft of the single deck; and
  aft of the nose gear, wherein one or more of the at least a nose gear and the at least a main gear occupies a gear housing that overlaps with a plane coincident with at least a portion of the single deck.

11. The method of claim 10, further comprising locating a cockpit substantially above the nose gear and the plane coincident with at least a portion of the single deck.

12. The method of claim 10, further comprising locating the at least a cargo store at least partially within a transitional portion of the blended wing body.

13. The method of claim 10, further comprising locating the at least a cargo store at least partially above a centerline, wherein the centerline is a center of a height of the aircraft above a floor of the aircraft.

14. The method of claim 13, further comprising locating a wing portion above the centerline.

15. The method of claim 10, wherein the at least a main gear comprises at least two landing gear assemblies.

16. The method of claim 10, wherein the at least a cargo store comprises a port cargo store and a starboard cargo store.

17. The method of claim 10, further comprising locating at least an exit, wherein the at least an exit is configured to allow egress from the passenger compartment.

18. The method of claim 10, further comprising locating the at least a cargo store at least partially within a wing portion of the blended wing body.

* * * * *